United States Patent Office 3,687,830
Patented Aug. 29, 1972

3,687,830
PREPARATION OF THIOL ESTERS
Alexis A. Oswald, Mountainside, and Wolfgang H. Mueller, Elizabeth, N.J., assignors to Esso Research and Engineering Company
No Drawing. Continuation-in-part of application Ser. No. 576,504, Aug. 26, 1966. This application Nov. 20, 1968, Ser. No. 777,500
Int. Cl. B01j *1/10*; C07c *153/07*; C07f *9/02*
U.S. Cl. 204—158 R    10 Claims

ABSTRACT OF THE DISCLOSURE

Thiol esters of thiolcarboxylic acids and thiolphosphoric acids are prepared by reacting the acids with a vinylic halide. The reaction is conducted in the liquid phase in the presence of a free radical initiator. The free radical addition reaction for the formation of the thiol esters is conducted at moderate temperatures and moderately elevated pressures. The products from the reaction, in particular the esters of thiophosphoric acids, are highly effective nematocides.

CROSS-REFERENCE TO RELATED APPLICATION

This application is a continuation-in-part of Ser. No. 576,504, filed Aug. 26, 1966, now abandoned.

BACKGROUND OF THE INVENTION

(I) Field of the invention

This invention pertains to an improved process for the formation of esters of thiolcarboxylic and thiolphosphoric acids. More particularly, the invention relates to the formation of the thiol esters through the liquid phase reaction of thiolcarboxylic and thiolphosphoric acids with vinylic halide compounds. Additionally, the invention pertains to a process for the formation of 2-substituted thioalkyl thiophosphates by reacting the thiol esters with a metal mercaptide or thiolate compound.

(II) Description of the prior art

The existence of esters of thiolcarboxylic and thiolphosphoric acids have been reported in the literature. As is disclosed in U.S. 2,611,728 and Canadian Pat. 570,162, the usual manner of forming compounds of this general type involves the use of substitution reaction. In U.S. 2,611,728, it is reported that the subject compounds could be formed by reacting ammonium diethyl dithiophosphate with ethylene dichloride in a refluxing acetone solution. With this reaction, a beta-chloroethyl diethyl dithiophosphate product was produced as well as ammonium chloride by-products. In this reaction, however, some ethylene bis-diethyldithiophosphate is also formed as a by-product in accordance with the following equation:

ClCH₂CH₂Cl (C₂H₅O)₂PS₂NH₄ → (C₂H₅O)₂PSCH₂CH₂Cl
                                              ‖
                                              S (C₂H₅O)PS₂NH₄ (C₂H₅O)₂PSCH₂CH₂SP(OC₂H₅)₂
→           ‖               ‖
             S               S

SUMMARY OF THE INVENTION

It has now been discovered that thiol esters can readily be produced by the addition reaction of certain thiol acids with vinylic halides. With this reaction the production of undesirable by-products can be avoided. The thiol esters produced with the present process can be employed as nematocides or reacted further with metal mercaptide or thiolate compounds for the production of systemic insecticides.

The thiol esters of this invention are easily prepared by reacting a thiol acid with a vinylic halide in the liquid phase in the presence of a free radical initiator. The thiol acids used in accordance with this invention are thiolcarboxylic acids and the thiolphosphoric acids having the following general formulae respectively:

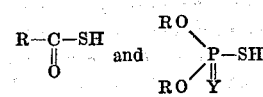

wherein R is selected from the group consisting of monovalent $C_1$ to $C_{16}$ alkyl radicals, monovalent $C_6$ to $C_{30}$ aryl radicals and substituted derivatives thereof. Preferably R is a $C_1$ to $C_6$ alkyl radical or a $C_6$ to $C_{16}$ aryl radical. Desirably, Y is a sulfur or oxygen atom, preferably a sulfur atom. Most preferably R is a monovalent $C_1$ to $C_3$ alkyl radical. It is preferred that the alkyl and aryl groups be unsubstituted; however halogen, e.g. chloro; alkylthio; alkoxy; aryl; etc. substituent groups may be added to the basic alkyl and aryl radicals without diminishing the activity of the product.

Representative examples of useful thiol acids include thiolacetic acid, thiolstearic acid, thiooctanoic acid, thiobenzoic acid, diethyl dithiophosphoric acid, dimethyl dithiophosphoric acid, dilauryl dithiophosphoric acid, dioctadecyl dithiophosphoric acid, diphenyl dithiophosphoric acid, ditolyl dithiophosphoric acid, ethyl phenyl dithiophosphoric acid, etc.

As stated earlier, the thiol esters are prepared by reacting either of the aforementioned thiol acids with a vinylic halide. The vinylic halide, particularly vinyl chloride, reacts quickly and easily in the liquid phase in the presence of a free radical catalyst with either of the aforementioned thiol acids. It was surprisingly discovered that 2-haloalkenes, particularly 2-halopropenes also react easily and quickly with the thiol acids. This is surprising in view of the fact that the higher 1-haloalkenes react very slowly to produce a very small yield.

Thus, the vinylic halides suitable for the practice of this invention have the following formula:

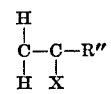

wherein X is a halogen atom, preferably a chlorine, bromine or fluorine atom, most preferably a chlorine atom, and R" is either a hydrogen radical or a monovalent substituted or unsubstituted $C_1$ to $C_{18}$ alkyl group. Preferably, R" is either a hydrogen radical or a $C_1$–$C_3$ alkyl radical. It is preferred that the alkyl groups be unsubstituted; however, certain substituent groups such as chloro, alkylthio, alkoxy, aryl, etc., can be added to the alkyl groups. In the ordinary production of 2-haloalkenes having at least three carbon atoms, the corresponding 1-haloalkene isomers are also produced. In accordance with this invention, it is not necessary to separate the 2-haloalkene from the mixture as the thiol acids react selectively with the 2-haloalkenes. Useful vinylic halides include vinyl bromide, propenyl chloride, butenyl chloride, octadecenyl chloride, phenylpropenyl chloride, methylthio vinyl chloride, hexenyl bromide, vinyl fluoride, vinylidene chloride, fluorovinyl chloride, etc.

The reactions of thiolcarboxylic acids and thiolphosphoric acids with vinylic halides are illustrated by the following equations:

I.

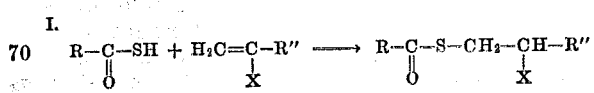

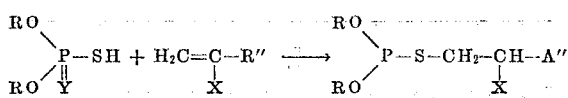

wherein X, Y, R, R'' are as previously described. In each of the reactions, the mole ratio of thiol acid to vinylic halide should be maintained in the range of from 1:1.5 to 3:1 and preferably in the range of 1:1.1 to 2:1. The reaction is usually carried out in the absence of any solvent; however, it may be necessary to use a solvent where a non-viscous reaction medium is desired. Aliphatic hydrocarbons, ketones and ethers, particularly thioethers, are the preferred solvents. Materials such as n-heptane, cyclohexane, diethyl ether, dimethyl sulfide, methylethyl ketone, etc. can be readily employed.

The reaction may be initiated with the use of a free radical initiator, such as radiation, e.g. ultraviolet light, heat, gamma rays, etc. or with a chemical initiator such as peroxides or azo compounds, e.g. dicumyl peroxide, azo-bisisobutyronitrile, etc. If a chemical initiator is used, it should usually be present in the range of 0.1 to 5 wt. percent preferably in the range of 0.1 to 3 wt. percent based on starting reactants.

The reaction can be completed within a range of from 0.1 hour to 3 days at ambient temperature. The reaction should be maintained at a temperature of from $-150°$ C. to $+150°$ C., preferably from $-80°$ to $100°$ C. The pressure within the reaction zone should be maintained at levels sufficient to assure a liquid phase reaction system. Reaction zone pressure may vary within the range of from 1 to 150 atmospheres and preferably from 1 to 80 atmospheres.

The compounds produced with the present process are effective nematocides. In addition, they can be employed as starting materials in the synthesis of commercial, systemic insecticides such as Systox and Disyston and, in general, for the synthesis of 2-substituted thioalkyl thiophosphates. Such materials are produced according to the following reaction sequence:

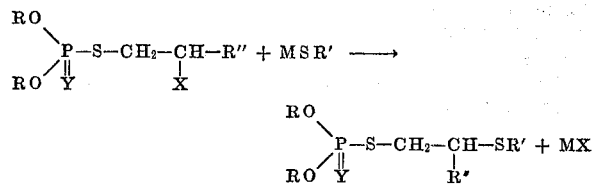

wherein MSR' represents a metal mercaptide or thiolate compound such that M designates a monovalent moiety such as sodium, ammonium, or potassium radicals and R' is a hydrocarbyl radical such as a $C_1$–$C_6$ alkyl radical or a $C_2$–$C_{10}$ acyl radical such as an acetyl or benzoyl radical.

The above reaction is carried out in the liquid phase at temperatures ranging from $-10$ to $150°$ C., preferably 10 to $100°$ C. The reaction may be conducted in the presence of typical aliphatic and aromatic hydrocarbon diluents. Reaction pressure is not critical; however, liquid phase conditions should be maintained.

The following examples demonstrate the process of the invention and the efficacy of the compounds prepared according to the process of this invention.

EXAMPLE 1

A stirred mixture of 38 grams (0.5 mole) of thiolacetic acid and 38 grams (0.5 mole) of 2-chloropropene was irradiated in a quartz tube with a 70 watt high pressure immersion ultraviolet lamp for six hours at $17°$ C. A nuclear magnetic resonance spectrum of the mixture indicated that 70% of the vinylic hydrogens disappeared due to the formation of 1-acetylmercapto-2-chloropropane. The pure product was isolated by fractionation in vacuo as a liquid boiling between 28–29° C. at 0.1 mm. of mercury pressure and the yield was 39 grams which was 73% of the calculated amount for the converted olefin.

*Analysis.*—Calculated for $C_5H_9ClOS$ (percent): C, 39.60; H, 5.32; Cl, 23.38; S, 21.15. Found (percent): C, 39.45; H, 5.68; Cl, 23.10; S, 21.40.

EXAMPLE 2

A stirred mixture of 47.4 grams (0.3 mole) of 90% technical grade dimethyldithiophosphoric acid and 22 grams (0.3 mole) of isomeric chloropropenes (1- and 2- in a 3 to 1 ratio) was reacted in a quartz tube under the influence of ultraviolet radiation at $15°$ C. for 65 hours. A subsequent analysis of the mixture by spectroscopy indicated that almost all of the 2-chloropropene but none of the 1-chloropropene reacted. The crude product was taken up in 300 milliliters of ether and the unchanged dimethyldithiophosphoric acid was removed by washing the solution with 5% sodium hydrogen carbonate. The ethereal phase was then separated, dried and fractionally distilled. A colorless liquid boiling at 77–79° C. at 0.1 mm. of mercury pressure, 18.3 grams of pure 1-dimethylthiophosphorylmercapto-2-chloropropane was thus obtained.

*Analysis.*—Calculated for $C_5H_{12}O_2ClPS_2$ (percent): C, 25.59; H, 5.15; P, 13.19; S, 27.33. Found (percent): C, 25.82; H, 5.25; P, 12.98; S, 27.77

EXAMPLE 3

A stirred mixture of 63.5 grams of dimethyldithiophosphoric acid and 34.2 grams of vinyl chloride was irradiated in a sealed quartz tube with a 70 watt high pressure immersion ultraviolet lamp for 48 hours at $17°$ C. The reaction mixture was then dissolved in 200 milliliters of ether and washed with 5% aqueous sodium bicarbonate. The ethereal solution was dried over magnesium sulfate and the ether removed at reduced pressure. The crude product weighed 76.44 grams and proved to be 85% pure on gas-liquid chromatography analysis. Fractional distillation yielded 57 grams (65% yield) of 2-chloroethyl dimethyldithiophosphate.

*Analysis.*—Calculated for $C_4H_{10}PS_2O_2Cl$ (percent): C, 21.77; H, 4.53; P, 14.06; S, 29.02; Cl, 16.10. Found (percent): C, 21.85; H, 4.69; P, 14.00; S, 29.63; Cl, 15.97.

Similar additions could be carried out under initiation by gamma radiation originating from a 4500 Curie $Co^{60}$ source placed at about 6 centimeters distance from the reaction mixture.

EXAMPLE 4

A mixture of 27.9 grams (0.15 moles) diethyldithiophosphoric acid and 6.3 grams (0.10 mole) vinyl chloride was reacted in the manner described in Example 1 for 120 hours. Analysis of the reaction mixture indicated a yield of 17 grams (70%) of 2-chloroethyl diethyldithiophosphate was a colorless liquid boiling between 74–76° C. at a pressure of 0.1 mm. of mercury.

EXAMPLE 5

2-chloroethyl dimethylmonothiophosphate can be prepared in a similar manner by the addition of dimethylthiophosphoric acid to vinyl chloride.

EXAMPLE 6

The 2-haloethyl thiolesters, synthesized as described in Examples 1–5, were tested as nematocides. The nematocidal tests were carried out by the so-called modified method of the Wisconsin Alumni Research Foundation using tomato plants potted in soil interested with an unknown strain of parasitic root knot nematode. Evaluation of the effectiveness of the compound was made on the basis of the signs of nematode activity, i.e. root knots formed, after about six weeks. On the basis of the number of root knots formed per plant, readings of nematode control were made and calculated in percent. They are shown in Table 1. The data pointed out that at the 40 pounds per 4 inch acre rate, chloroalkyl esters of thiolacetic acid and dimethyldithiophosphoric acid are active nematocides. The 2-chloroethyl ester of dimethyldithiophosphoric acid (Example 3) is outstanding in this respect. It is still active at the 5 pounds per acre level. In contrast, the 2-chloroethyl ester of diethyldithiophosphoric acid is inactive at the 20 pounds per acre level.

TABLE I
Nematocidal Effectiveness of 2-Haloalkyl Thiolesters

| Active ingredient | | Percent control of root knot nematodes at various application rates | | | |
|---|---|---|---|---|---|
| Example | Structure | 40 lbs./acre | 20 lbs./acre | 10 lbs./acre | 5 lbs./acre |
| 1 | $CH_3COSCH_2CHCl$ <br> \| <br> $CH_3$ | 99 | 70 | 8 | |
| 2 | $(CH_3O)_2 P\ S\ CH_2CHCl$ <br> $\parallel$ \| <br> $S$ $CH_3$ | | 92 | 58 | 0 |
| 3 | $(CH_3O)_2 P\ S\ CH_2CH_2Cl$ <br> $\parallel$ <br> $S$ | | 99 | 95 | 87 |
| 4 | $(C_2H_5O)_2 P\ S\ CH_2CH_2Cl$ <br> $\parallel$ <br> $S$ | | 0 | 0 | 0 |
| 5 | $(CH_3O)_2 P\ S\ CH_2CH_2Cl$ <br> $\parallel$ <br> $O$ | 83 | 0 | | |

In another test, tomato seeds were planted into soil inoculated with virulent strains of three common soil fungi: *Fusanium oxysporum, Pythium Debaramim* and *Rhizoctonia solani*. Part of the soil was treated with the adduct of Examples 1 and 4 at a concentration corresponding to 100 lbs. per 4 in. acre. Some uninoculated soil was also seeded. After a three-week growth period, the following results were found:

| Soil | Number of plants surviving | | No treatment |
|---|---|---|---|
| | Example 1 | Example 4 | |
| Inoculated | 10 | 8 | 0 |
| Uninoculated | 15 | 14 | 12 |

The results show that a higher number of plants survived in both the inoculated and uninoculated soils if they were treated with the adduct of Example 1 or Example 4.

The thiolesters produced with the present process may vary from highly mobile liquids to solids and, while they may be applied as such to the soil habitat of the nomatodes, it has been found desirable to apply them in a carrier. Suitable carriers include inert solids for the formation of dust or, more preferably the nematocide is suspended in a suitable liquid diluent, preferably water. There can also be added surface active agents and inert solids in such liquid formulations. From 0.05 to 1 wt. percent of a surface active agent may be employed. The active ingredient should be employed in a concentration of from 0.011 to 95 wt. percent of the entire composition.

In place of water, there can be employed organic solvents as carriers, for example, hydrocarbons, such as benzene, toluene, xylene, kerosene, diesel oil, fuel oil, and petroleum naphtha; ketones, such as acetone, methylethyl ketone, and cyclohexanone; chlorinated hydrocarbons, such as carbon tetrachloride, chloroform, trichloroethylene, and perchloroethylene; esters, such as ethylacetate, amylacetate and butyl acetate, glycol ethers, for example, monomethylether of ethylene glycol and monomethylether of diethylene glycol, alcohols, for example, ethanol, isopropanol, and amyl alcohol.

The thiolesters can also be applied along with inert solid fungicidal adjuvants or carriers, such as talc, pyrophyllite, synthetic fine silica, kieselguhr, chalk, diatomaceous earth, lime, calcium carbonate, bentonite, fuller's earth, cotton seed balls, wheat flour, soy bean flour, etc.

It is frequently desirable to incorporate a surface active agent in the nematocidal compositions of this invention.

Such surface active agents are advantageously employed in both the solid and liquid compositions. The agents can be anionic, cationic, or nonionic in character. Typical classes of surface active agents include alkyl sulphonates, alkyl aryl sulphonates, alkyl sulfates, fatty acid esters of polyhydric alcohols and the like.

The invention has been described with a certain degree of particularity. It is to be understood that the invention is not limited to the specific examples which have been offered merely as illustration since other materials can be prepared and that modifications may be made without departing from the spirit of the invention.

What is claimed is:

1. A process for the production of 2-haloalkylthiol esters comprising reacting in the liquid phase in the presence of a free radical initiator a thiol acid of the formula $$\begin{array}{c} RO \\ \phantom{RO}\searrow \\ \phantom{RO}\phantom{x}P{-}SH \\ \phantom{RO}\nearrow \parallel \\ RO \phantom{xx} S \end{array}$$

wherein R is selected from the group consisting of $C_1$ to $C_{30}$ alkyl radicals, $C_6$ to $C_{30}$ aryl radicals and substituted derivatives thereof, with a vinylic halide of the formula $$H_2C{=}C{-}R'' \\ \phantom{xxxx}| \\ \phantom{xxxx}X$$

wherein R'' is selected from the group consisting of hydrogen and substituted and unsubstituted $C_1$ to $C_{18}$ alkyl radicals, and X is a halogen atom.

2. The process for the production of 2-haloalkyl thiolesters comprising reacting a thiol acid of the formula:

$$\left[ \begin{array}{c} R{-}C{-}SH \\ \parallel \\ O \end{array} \text{ and } \right] \begin{array}{c} RO \\ \phantom{x}\searrow \\ \phantom{xx}P{-}SH \\ \phantom{x}\nearrow \parallel \\ RO \phantom{xx} S \end{array}$$

wherein R is selected from the group consisting of $C_1$ to $C_6$ alkyl radicals and $C_6$ to $C_{16}$ aryl radicals, with a vinylic halide of the formula:

$$H_2C{=}C{-}R'' \\ \phantom{xxxx}| \\ \phantom{xxxx}X$$

wherein R'' is selected from the group consisting of hydrogen and $C_1$ to $C_3$ alkyl radicals and X is a halogen atom selected from the group consisting of chlorine, bromine, and fluorine atoms, said reaction being conducted in the liquid phase in the presence of a free radical initiator at a temperature varying from —80° to 100° C.

3. The process of claim 2 wherein R'' is a $C_1$ to $C_3$ alkyl radical and said vinylic halide is present in admixture with a 1-haloalkene.

4. The process of claim 2 wherein said free radical initiator is radiation.

5. The process of claim 2 wherein X is a chlorine atom.

6. The process of claim 2 wherein said vinylic halide is vinyl chloride.

7. The process of claim 2, wherein R" is a methyl radical, X is a chlorine atom and said vinylic halide is present in admixture with 1-chloropropene.

8. The process of claim 2, wherein R is selected from the group consisting of methyl and ethyl radicals.

9. A process for the production of 2-chloropropyl dithiophosphates comprising reacting a dithiophosphoric acid of the formula:

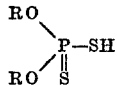

wherein R is selected from the group consisting of methyl and ethyl radicals, with a 2-chloropropene in admixture with 1-chloropropene in the liquid phase in the presence of an ultraviolet radiation source, at a temperature varying from −80° to 100° C.

10. The process of claim 9 wherein said 2-chloropropene is reacted to a substantially complete conversion.

References Cited
UNITED STATES PATENTS

| | | | |
|---|---|---|---|
| 2,810,687 | 10/1957 | Rueggeberg et al. | 204—158 |
| 3,318,940 | 5/1967 | Ladd | 204—158 |
| 3,441,589 | 4/1969 | Oswald | 204—158 |
| 3,483,278 | 12/1969 | Mueller et al. | 204—158 |

HOWARD S. WILLIAMS, Primary Examiner

U.S. Cl. X.R.

204—158 HE; 260—455 R, 979